United States Patent [19]
Cook

[11] Patent Number: 5,477,395
[45] Date of Patent: Dec. 19, 1995

[54] TWO NESTED ALL-REFLECTIVE AFOCAL TELESCOPES PROVIDING FOUR FIELDS OF VIEW

[75] Inventor: Lacy G. Cook, El Segundo, Calif.

[73] Assignee: Hughes Aircraft Company, Los Angeles, Calif.

[21] Appl. No.: 338,717

[22] Filed: Nov. 14, 1994

[51] Int. Cl.⁶ .............................. G02B 5/10; G02B 17/06
[52] U.S. Cl. ................... 359/861; 359/365; 359/366; 359/859
[58] Field of Search .................... 359/364, 365, 359/366, 730, 731, 858, 859, 861

[56] References Cited

U.S. PATENT DOCUMENTS

| | | | |
|---|---|---|---|
| 4,205,902 | 6/1980 | Shafer | 359/366 |
| 4,226,501 | 10/1980 | Shafer | 359/366 |
| 4,804,258 | 2/1989 | Kebo | 359/366 |
| 4,812,030 | 3/1989 | Pinson | 359/859 |
| 4,964,706 | 10/1990 | Cook | 359/366 |
| 5,009,494 | 4/1991 | Iossi et al. | 359/859 |
| 5,078,502 | 1/1992 | Cook | 359/859 |
| 5,144,476 | 9/1992 | Kebo | 359/366 |
| 5,227,923 | 7/1993 | Kebo | 359/859 |

*Primary Examiner*—Ricky D. Shafer
*Attorney, Agent, or Firm*—M. W. Sales; W. K. Denson-Low

[57] ABSTRACT

An all-reflective multiple field of view optical system has first (10) and a second (12) reflecting assemblies which share a common package volume in a single unit. The first (10) and second (12) reflecting assemblies rotate with respect to one another to provide multiple fields of view utilizing a common entrance pupil region (14) and a viewing plane (16). Likewise, each reflecting assembly provides a multiple field of view.

10 Claims, 10 Drawing Sheets

TWO NESTED ALL-REFLECTIVE AFOCAL TELESCOPES PROVIDING FOUR FIELDS OF VIEW

BACKGROUND OF THE INVENTION

1. Technical Field

The present invention relates to reflective telescope systems and, more particularly, to nesting of two all-reflective afocal telescopes to provide four fields of view.

2. Discussion

When viewing a distance object through a telescope system, the observer is commonly interested in performing two separate and sequential functions. The first of these functions is a coarse search over a large field of view for the purpose of locating or acquiring previously undetected objects. The second function is the fine examination over a smaller field of view for the purpose of identification or discrimination of the previously located object.

It is desirable to have a single optical system which is capable of providing both the coarse search over a large field and the fine examination over a smaller field. An example of such a system is illustrated in U.S. Pat. No. 5,009,494, issued Apr. 23, 1991 to Iossi et al, entitled "Wide Field All-Reflective Multiple Field Of View Telescope", the specification and drawings of which are hereby expressly incorporated by reference. Here, a single optical system utilizes a pair of three-mirror astigmats which may be moved with respect to one another to provide a multiple field of view optical system. This invention provides a lower magnification, coarse resolution, wider field of view extreme to enable search and acquisition functions during operation of the system and also a higher magnification, finer resolution, narrower field of view to enable tracking and detailed imaging during the operation of the system. This system provides two fields of view.

SUMMARY OF THE INVENTION

According to the teachings of the present invention, an optical system is provided which utilizes the versatility and benefits of reflective optics in multi-field and multi-spectral applications. The present invention provides a single optical system with a pair of four-mirror afocal telescopes which may be moved with respect to one another to provide a multiple field of view optical system.

Generally, the optical system will include a pair of lower magnification, coarse resolution, wide and medium fields of view to enable search and acquisition functions during operation of the system. Also, the system will include a pair of higher magnification, finer resolution, narrow and ultra narrow fields of view to enable tracking and detailed imaging during operation of the system.

The present invention provides the art with an all-reflective afocal optical system which exhibits substantially unobscured aperture and field capabilities. The optical system of the present invention has its optical output in the same direction as its input, which enables the system to be used in several applications. The present invention provides for correction of spherical aberration, coma and astigmatism, while providing a flat field of view. Both of the reflective telescopes of the invention utilize common entrance pupil regions and a common exit pupil. The invention is capable of being utilized with fore or aft optics in an optical train.

In the preferred embodiment, the reflective multiple field of view optical system includes an entrance pupil region, first and second assemblies for reflecting light from a viewed object and a viewing plane. The first and second reflecting assemblies are movably positioned with respect to one another such that in a first position, one of the reflecting assemblies reflects light from the entrance pupil to a viewing plane which includes two fields of view. In a second position, the other of the reflecting assemblies reflects light from the entrance pupil to the plane for viewing which includes two fields of view. The four fields of view provided by the first and second reflecting assemblies are all different and progress in size in a uniform manner from large to small.

DETAILED DESCRIPTION OF THE PREFERRED EMBODIMENT

Figure 1:
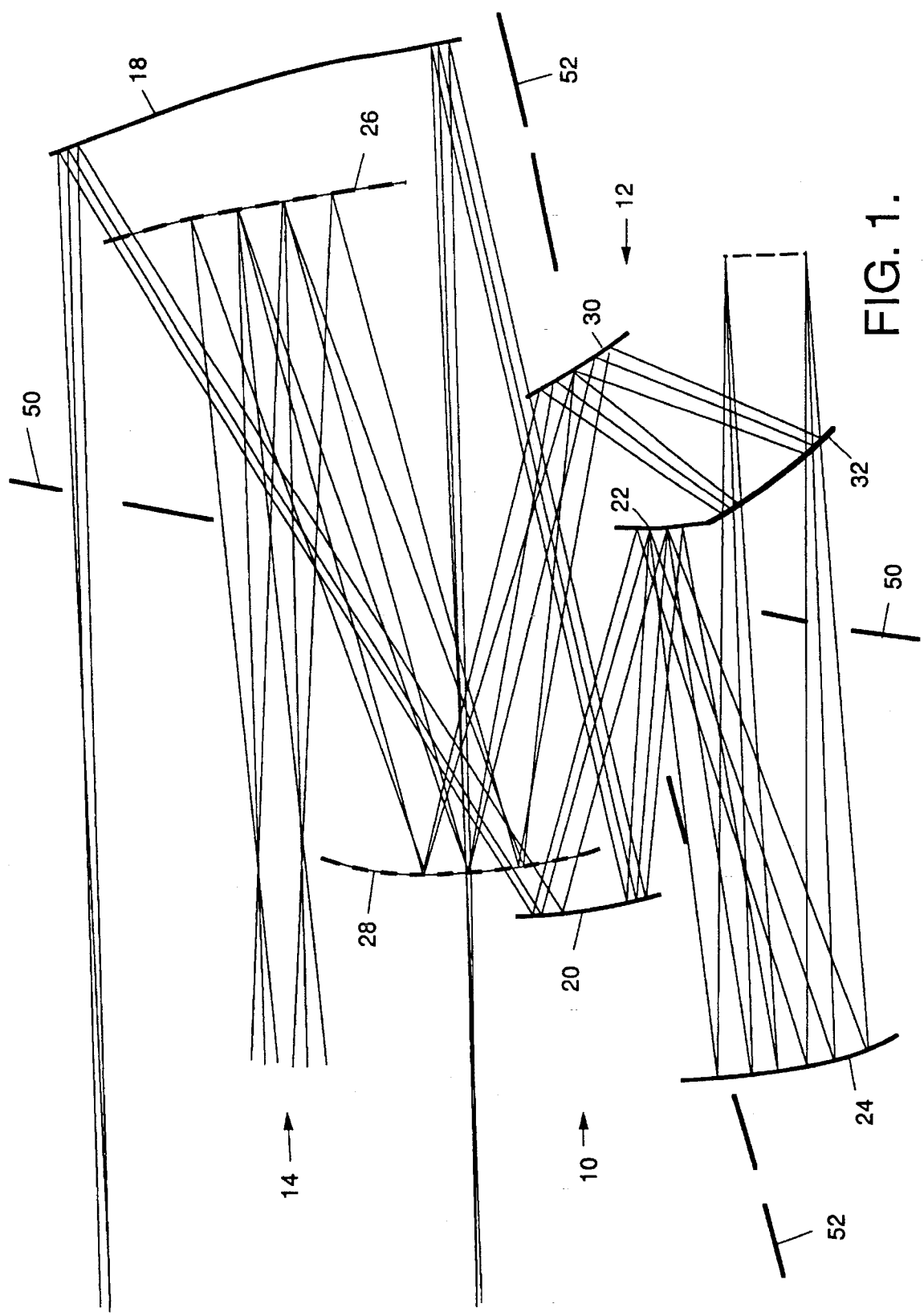
FIG. 1 is a schematic diagram of an elevation view of the nesting of first and second optical assemblies in accordance with the teaching of the present invention, the view showing solid rays for the ultra-narrow field of view formed by solid mirrors of the first optical assembly, and dashed rays for the medium field of view formed by the dashed mirrors of the second optical assembly.
Figure 2:
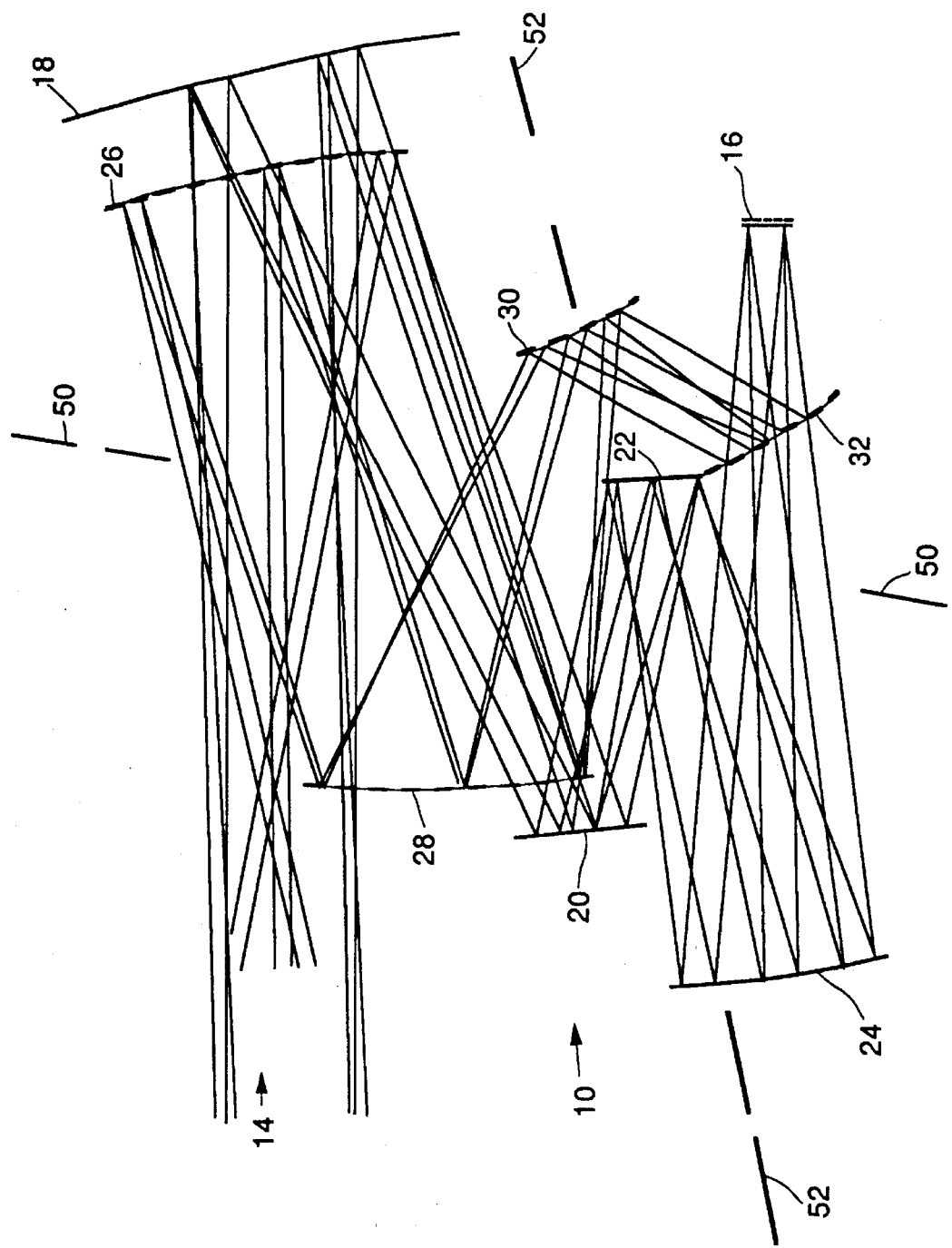
FIG. 2 is a schematic diagram of an elevation view of the nesting of the first and second optical assemblies, the view showing solid rays for the narrow field of view formed by solid mirrors of the first optical assembly, and dashed rays for the wide field of view formed by the dashed mirrors of the second optical assembly.

Referring to FIGS. 1 and 2, an afocal optical system includes a first reflecting assembly 10 designated by solid mirrors and rays, and a second reflecting assembly 12 designated by dashed mirrors and rays. The system also includes an entrance pupil region 14 and an exit pupil 16. The optical input to the two reflective assemblies through the entrance pupil region 14 is in the same direction as and parallel to the optical output at the exit pupil 16.

The first reflecting assembly includes a primary mirror 18, secondary 20, tertiary 22 and quartenary 24 mirror. Likewise, the second reflecting assembly 12 includes a primary mirror 26, secondary mirror 28, tertiary 30 and quartenary 32 mirror.

Figure 3:
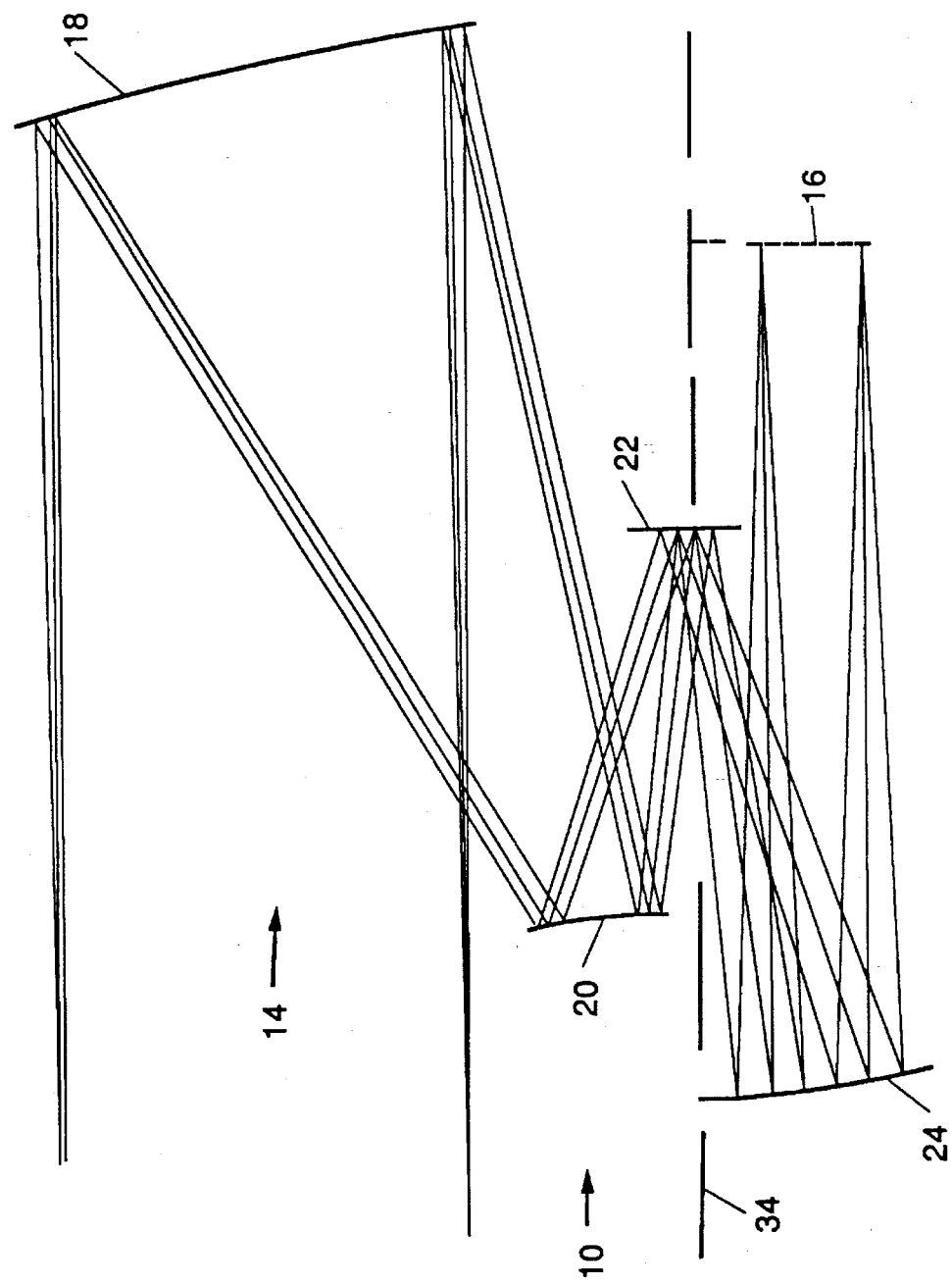
FIG. 3 is a schematic diagram of an elevation view of the first optical assembly of FIG. 1, the view showing the rays for the ultra-narrow field of view.
Figure 4:
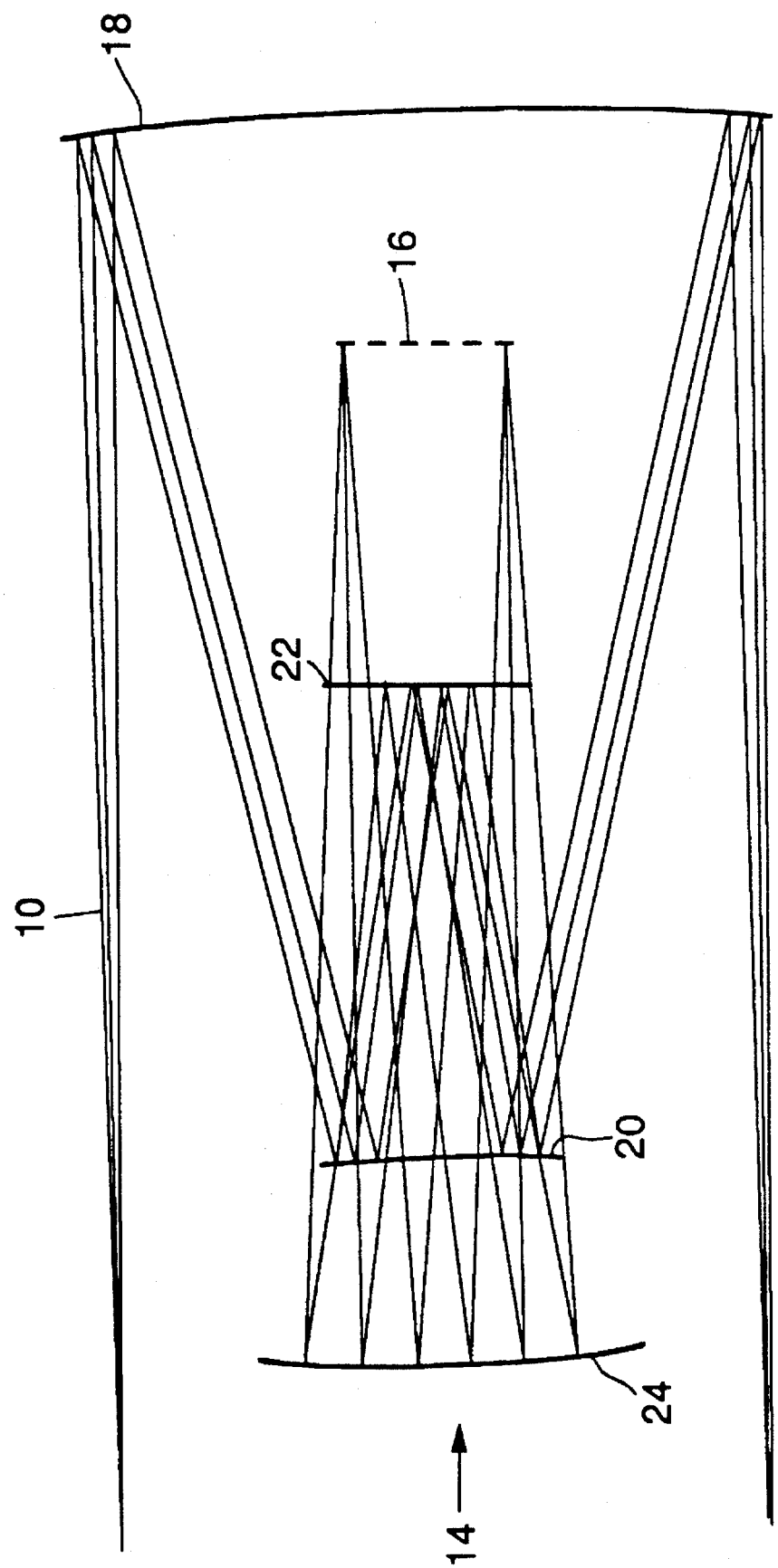
FIG. 4 is a schematic diagram of an azimuth view of the assembly shown in FIG. 3.

Turning to FIGS. 3 and 4, the first reflecting assembly 10 is illustrated by itself. The primary mirror 18 includes a central axis 34 defining the system optical axis. The primary mirror 18 is a concave positive power mirror and may be a parabolic, conic or higher order aspheric mirror.

The secondary mirror 20 is a convex negative powered mirror and is positioned such that it is in a Cassegrain-like configuration with the primary mirror 18. The secondary mirror 20 is fixably positioned off-axis with respect to the optical axis 34. The secondary mirror 20 may be a hyperboloid, conic or higher order aspheric mirror.

The tertiary mirror 22 is substantially flat with little or no power. The tertiary mirror is fixably positioned nearly on-axis with respect to the optical axis 34 of the system.

The quartenary mirror 24 is a concave positive power mirror. The quartenary mirror 24 is fixably positioned such that it is positioned off-axis with respect to the optical axis 34 of the system. The quartenary mirror 24 may be a parabolic, conic or higher order aspheric mirror.

Figure 5:
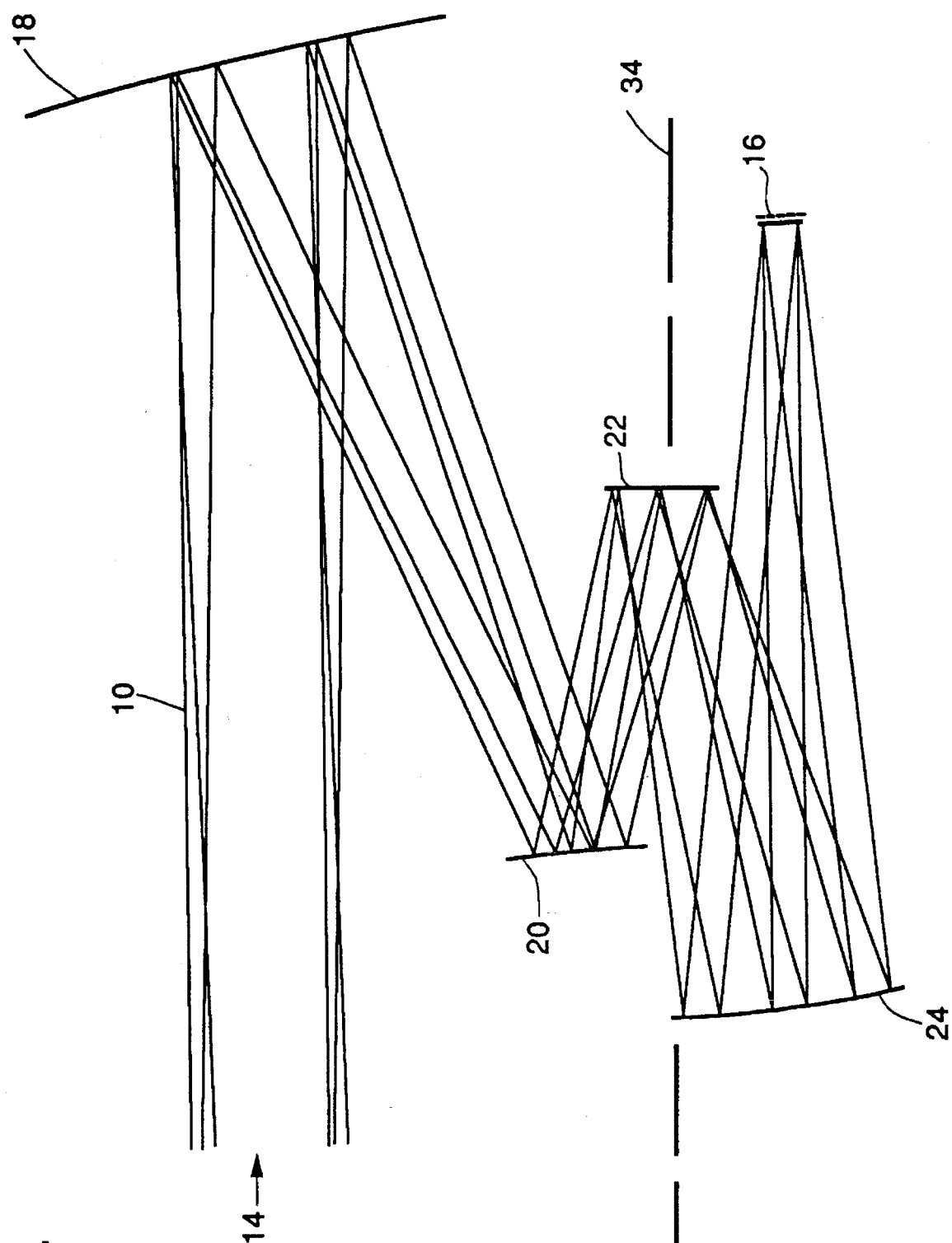
FIG. 5 is a schematic diagram of an elevation view of the first optical assembly of FIG. 1, the view showing rays for the narrow field of view
Figure 6:
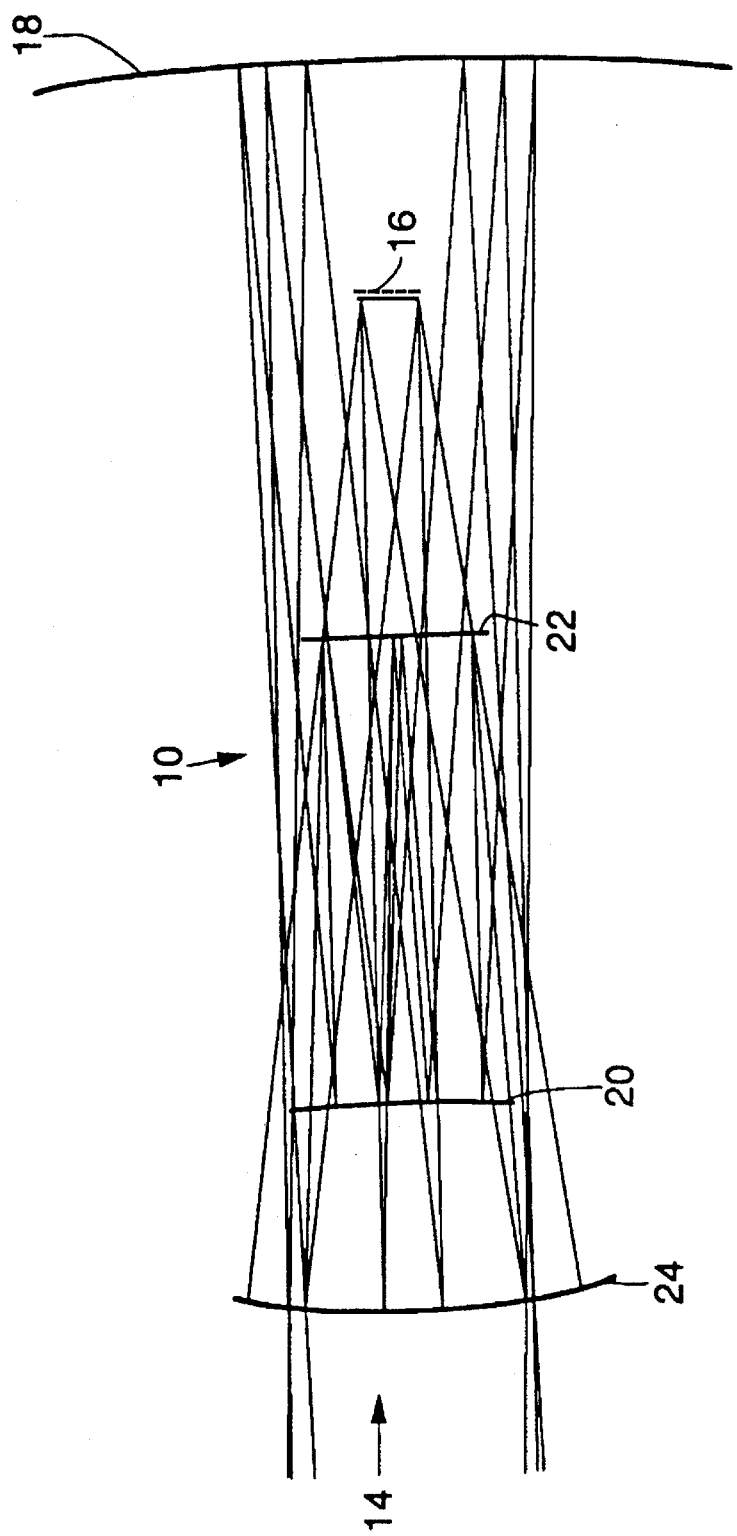
FIG. 6 is a schematic diagram of an azimuth view of the assembly shown in FIG. 5.

The first reflecting assembly 10 generally performs a narrow field of view operation. The first reflecting assembly 10 generates an ultra narrow field of view as well as a narrow field of view in operation. In FIGS. 3 and 4, the ultra-narrow field of view is illustrated, and in FIGS. 5 and 6, the narrow field of view is illustrated. Both the ultra narrow field of view and the narrow field of view provide high magnification, finer resolution and smaller fields of view enabling tracking and detailed imaging during operation of the optical system. In the present invention, the ultra narrow field of view has a 3 inch aperture and a 1.125° field of view, while the narrow field of view has a 1.13 inch aperture and a 3° field of view. Also, the reflecting assembly 10 has an afocal magnification of 4.0x.

Figure 7:
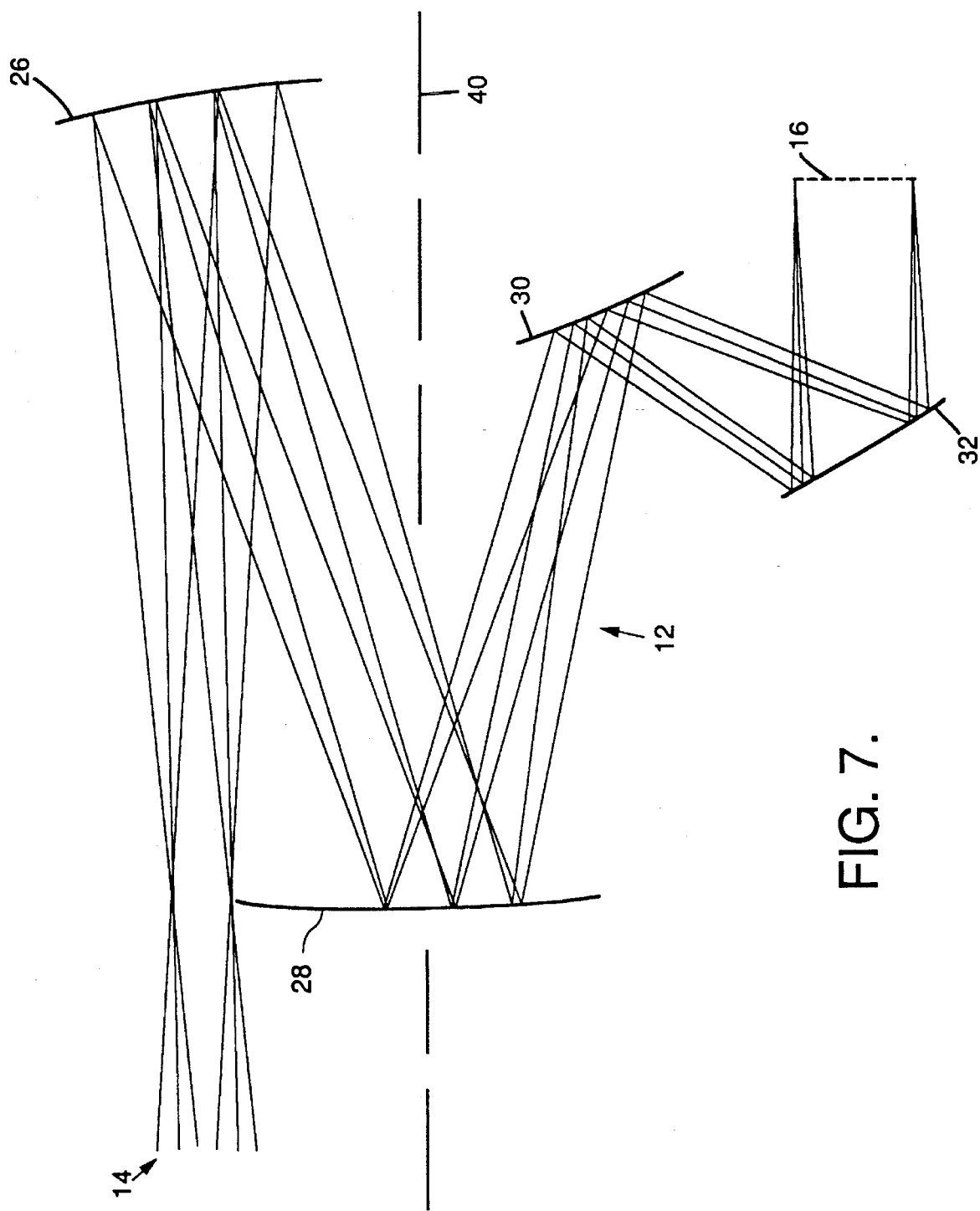
FIG. 7 is a schematic diagram of an elevation view of the second optical assembly of FIG. 1, the view showing rays for the medium field of view
Figure 8:
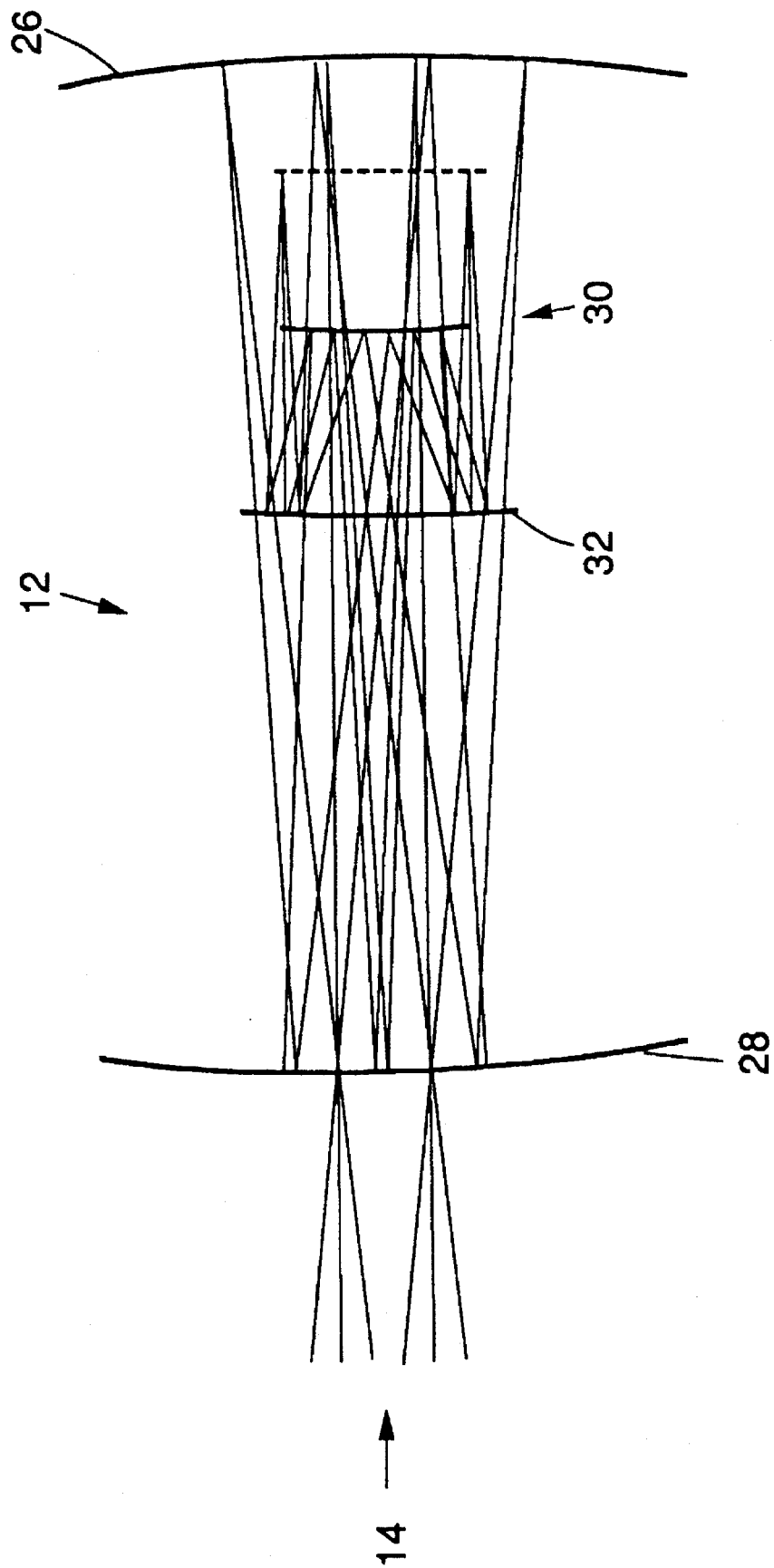
FIG. 8 is a schematic diagram of an azimuth view of the assembly shown in FIG. 7.

Turning to FIGS. 7 and 8, the primary mirror 26 of the second reflecting assembly 12 includes a central axis 40 defining the system optical axis. The primary mirror 26 is a concave positive power mirror and may be a paraboloid, conic or higher order aspheric mirror.

The secondary mirror 28 of the second reflecting assembly 12 is a weakly concave positive power mirror and is fixably positioned nearly on-axis with respect to the optical axis 40 of the system. The secondary mirror 28 may be a conic or higher order aspheric mirror.

The tertiary mirror 30 is a convex negative power mirror. The tertiary mirror 30 is fixably positioned off-axis with respect to the system and may be a hyperboloid, conic or higher order aspheric mirror.

The quartenary mirror 32 of the second reflecting assembly 12 is a concave positive powered power mirror. The quartenary mirror 32 is fixably positioned off-axis with respect to the system. The quartenary mirror 32 may be a paraboloid, conic or higher order aspheric mirror.

Figure 9:
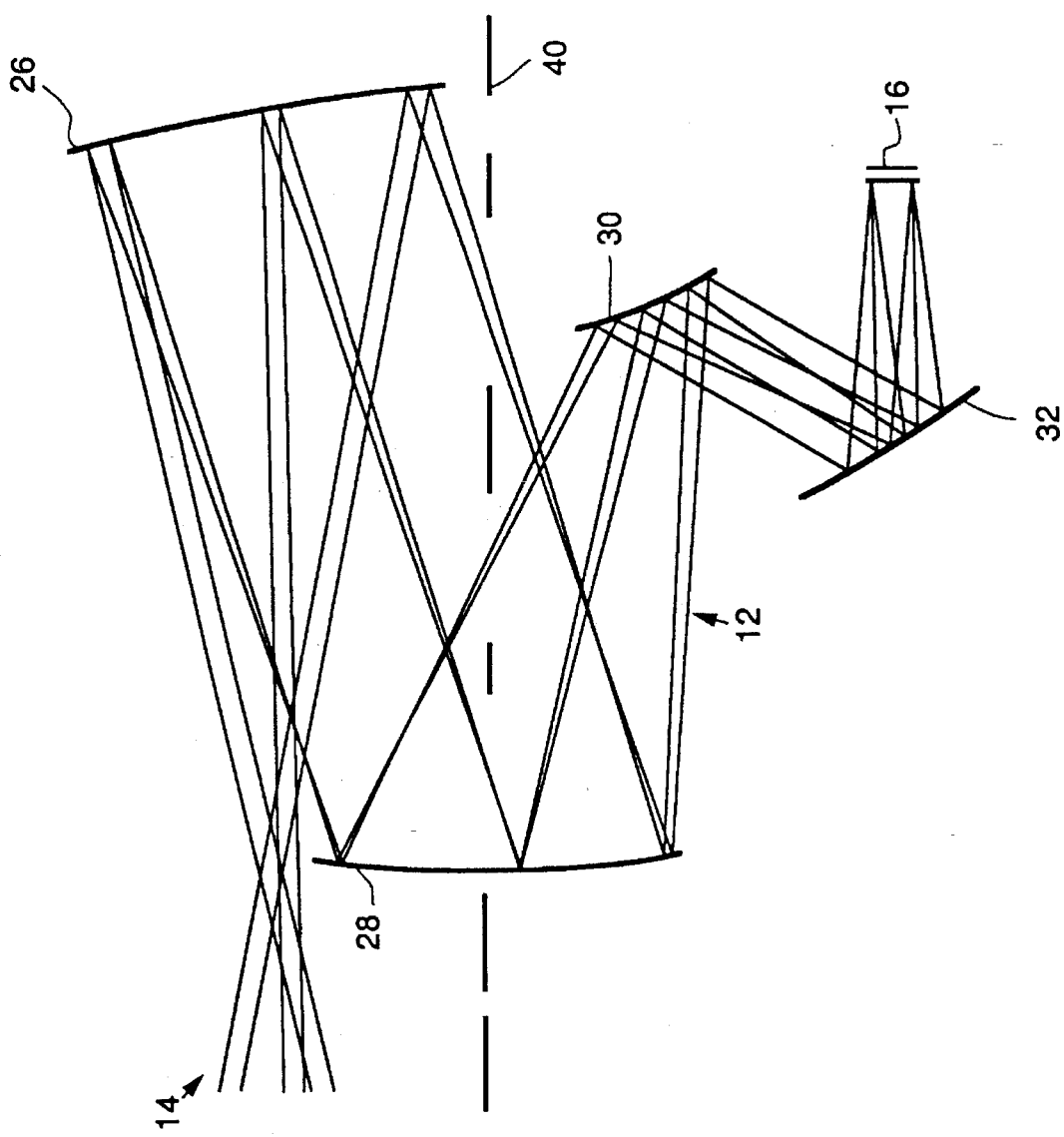
FIG. 9 is a schematic diagram of an elevation view of the second optical assembly of FIG. 1, the view showing rays for the wide field of view
Figure 10:
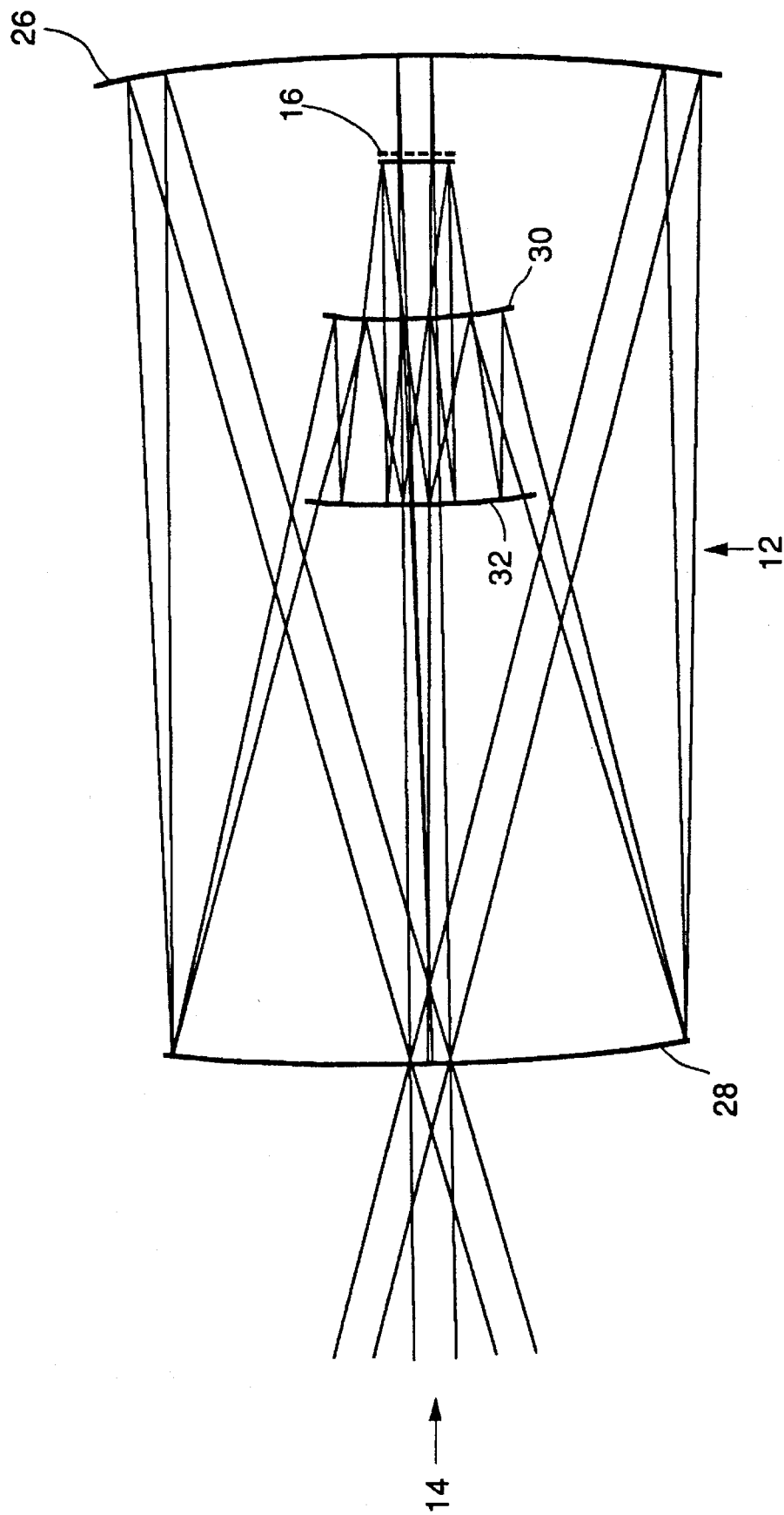
FIG. 10 is a schematic diagram of an azimuth view of the assembly shown in FIG. 9.

The second reflecting assembly 12 generally performs a medium and wide field of view operation. In FIGS. 7 and 8, the medium field of view is illustrated, and in FIGS. 9 and 10, the wide field of view is illustrated. The medium and wide field of view provides a lower magnification, coarser resolution, larger field of view extremes to enable search and acquisition functions during operation of the optical system.

The second reflecting assembly 12 is an afocal telescope having a magnification of about 0.5x. The medium field of view has an aperture opening of about 0.38 inch and a 9° field of view, which is illustrated by the outer rays. The wide field of view has a 0.14 inch aperture and a 24° field of view and is illustrated by the inner rays.

Generally, the above mirrors can be machined using precision diamond turning techniques which provide for high optical transmission. Also, the precision machinery enables fewer total parts and the use of relatively inexpensive materials when compared to refractive elements.

Turning back to FIGS. 1 and 2, a vertical axis 50 is shown. Both the first 10 and second 12 reflecting assemblies are rotatable about the vertical axis 50. Both the first 10 and second 12 reflecting assemblies are fixably positioned with respect to itself, however, each is rotatable about the vertical axes to a 90° position such that the other of the reflecting assemblies is out of the way when the other of the assemblies is receiving its input. Thus, the second reflecting assembly mirrors are rotatable with respect to the first reflecting assembly mirrors. The movability or pivoting of the mirrors of the second reflecting assembly 12 enables the telescope to be compact and for the second reflecting assembly 12 to pivot 90° with respect to the first reflecting assembly 10. This pivoting of 90° enables the mirrors of the second assembly to be positioned out of the line of sight of the first reflecting assembly 10 and therefore enables the light to pass from the object being viewed through the first reflecting assembly 10. Once it is desirable to utilize the second reflective assembly 12, the mechanism can be moved or pivoted so that the second reflecting assembly mirrors are aligned for viewing the object to be viewed. The system utilizes the common entrance pupil region 14 and common exit pupil 16.

Also as shown in FIG. 2, the reflecting assemblies 10 and 12 could be rotated about a horizontal axis 52. Thus, as mentioned above, either reflecting assembly could be rotated about the axis 52 in and out of the line of sight.

Thus, the field switch mechanism which selects for operative use either the first reflective assembly 10 or the second reflective assembly 12 could operate either about the vertical axis 50 or the horizontal axis 52.

Having selected one or the other of the two reflecting assemblies by actuation of this mechanism, a means would also be present, in prior or subsequent portions of the optical path, to determine which of the two fields of view provided by the selected reflecting assembly would be utilized. If the first reflecting assembly 10 had been selected, this means would determine whether the ultra narrow or narrow field of view would be used. In a similar manner, this same means would determine whether the medium or wide field of view would be used, had the second reflective assembly 12 been selected.

An example of this type of means is a subsequent image forming optical device, the focal length of which can be chosen to be one of two possible values. Such devices are well known. Thus, the focal length switching means with two possible values taken together with the afocal magnification switching with two possible values provided by the present invention provides four distinct fields of view. Further, these four fields of view are generated with a minimum of size and complexity, and through a common entrance pupil region.

A specific prescription for the system in accordance with the present invention as illustrated in FIGS. 1 through 6 is as follows:

TABLE 1

| # | Description | Radius | Conic Constant | Thickness | O | E | F | G |
|---|---|---|---|---|---|---|---|---|
| 10 | first reflective assembly | | | | | | | |
| 18 | primary mirror | −17.576 | −1.0966 | −6.735 | | | | |
| 20 | secondary mirror | −10.601 | −22.572 | 2.878 | | | | |
| 22 | tertiary mirror | 23.389 | −780.17 | −4.255 | | | | |
| 24 | quartenary mirror | 7.436 | −0.66370 | 6.367 | | | | |
| 16 | exit pupil | | | | | | | |
| 12 | second reflective assembly | | | | | | | |
| 26 | primary mirror | −9.2383 | −0.59085 | −5.301 | 0.80150 E-4 | 0.53932 E-4 | −0.62282 E-5 | 0.30931 E-6 |
| 28 | secondary mirror | 11.055 | −64.570 | 3.543 | 0.32585 E-2 | 0.43566 E-3 | −0.18456 E-3 | 0.20375 E-4 |
| 30 | tertiary mirror | 2.623 | −2.1771 | −1.502 | 0.35964 E-3 | −0.16050 E-3 | 0.94738 E-4 | −0.15404 E-4 |
| 32 | quartenary mirror | 5.008 | −0.92405 | 2.580 | −0.83222 E-5 | 0.15486 E-5 | 0.31855 E-7 | −0.21165 E-6 |
| 16 | exit pupil | | | | | | | |

[(+) Thicknesses are to the right
(+) Radii have centers to the right
(+) Decenters are up
(+) Tilts are counterclockwise
Decenters are done before tilting
Tilt units are degrees]

Surface SAG = $Z = \dfrac{cp^2}{1+\sqrt{1-(K+1)c^2p^2}} + Dp^4 + Ep^6 + Fp^8 + Gp^{10}$ where:
C = 1/Radius
K = Conic Constant
$p^2 = x^2 + y^2$

TABLE 2

| 1 | Description | Afocal Magnification | Field of View | Exit Pupil Diameter, inch | Aperture Offset, inch |
|---|---|---|---|---|---|
| 10 | first reflective assembly | 4.0x | 1 125" × 1.5"<br>3" × 4" | 3 00 × 4.00<br>1 13 × 1.50 | 3.36 |
| 12 | second reflective assembly | 0.5x | 9" × 12"<br>24" × 32" | 0 38 × 0.50<br>0 14 × 0.19 | 1.40 |

Optical system fields of view may be changed automatically or manually from the ultra narrow to the narrow field of view and from these fields of view to the medium and wide fields of view. Further, the optical system may be used with fore or aft optics to enhance the utilization of the present optical system. The compact two telescope system with its multi-field and multi-spectral optical design may be utilized in periscope technology.

The present invention has several advantages over the previous optical systems. The present invention increases the range of the fields of view to 21.3x (32° az wide field of view to 1.5° az ultra narrow field of view) over the Iossi patent, thus providing a narrower narrow field of view and a wider wide field of view. The invention provides telescopes which are nested with respect to one another and which can be rotated out of the line of sight of one another to provide more than one field of view. Likewise, each telescope provides more than one field of view. The optical system also minimizes the space requirements for multiple field of view systems.

Prior U.S. Pat. No. 5,009,494 provided a narrow field of view of 2.5°×3.7° and a wide field of view of 7.5°× 11.1°. The present invention provides a nesting of two four-mirror afocal optical systems to yield four fields of view. The ultra narrow field of view is 1.125°×1.5°, the narrow field of view is 3°×4°, the medium field of view is 9°×12°; and the wide field of view is 24°×32°. Thus, the present invention provides more fields of view and a broader range of fields of view. Further, the '494 patent provides a 3:1 overall field switch ratio, while the present invention provides a 21:1 overall field switch ratio.

It should be understood that while this invention has been described in connection with the particular example hereof, that various modifications, alterations, variations and changes of the present embodiment can be made after having the benefit of the study of the specification, drawings and subjoined claims.

What is claimed is:

1. An all-reflective multiple field of view optical system comprising:

an entrance pupil region;

a first reflecting assembly having a primary mirror with a central axis, a secondary mirror facing said primary mirror such that light from a viewed object is reflected by said secondary mirror, a tertiary mirror positioned to receive light from said secondary mirror and a quartenary mirror positioned to receive light from said tertiary mirror, such that said quartenary mirror reflects an image of the object being viewed to a plane for viewing;

a second reflecting assembly including a primary mirror having a central axis, a secondary mirror facing said primary mirror such that light from a viewed object is reflected by said secondary mirror, a tertiary mirror positioned to receive light from said secondary mirror and a quartenary mirror positioned to receive light from said tertiary mirror such that said quartenary mirror reflects an image of the object being viewed to said plane for viewing; and said first and second reflecting assemblies being movably positioned with respect to one another such that in a first position one of said assemblies reflects light from said entrance pupil region to said plane for viewing and in a second position the other of said assemblies reflects light to said plane for viewing, wherein the fields of view and afocal magnification of said first and second reflecting assemblies are different.

2. The all-reflective multiple field of view optical system according to claim 1, wherein each said reflecting assembly provides more than one field of view.

3. The all-reflective multiple field of view optical system according to claim 2, wherein said first telescope provides ultra narrow and narrow fields of view, and wherein said second telescope provides medium and wide fields of view.

4. The all-reflective multiple field of view optical system according to claim 1, wherein said primary mirrors have positive power.

5. The all-reflective multiple field of view optical system according to claim 1, wherein said first and second reflecting assemblies are afocal.

6. The all-reflective multiple field of view optical system according to claim 1, wherein said secondary mirror of said first assembly and said tertiary mirror of said second assembly have negative power.

7. The all-reflective multiple field of view optical system according to claim 1, wherein said first and second reflecting assemblies are off-axis.

8. The all-reflective multiple field of view optical system according to claim 1, wherein the second reflecting assembly can be pivoted by about 90 degrees with respect to the first reflecting assembly.

9. The all-reflective multiple field of view optical system according to claim 1, wherein said first reflecting assembly includes a positive power primary mirror, a negative power secondary mirror, a substantially flat tertiary mirror and a positive power quartenary mirror.

10. The all-reflective multiple field of view optical system according to claim 1, wherein said second reflecting assembly includes a positive power primary mirror, a positive power secondary mirror, a negative power tertiary mirror and a positive power quartenary mirror.

* * * * *